April 7, 1931.  W. H. MILLSPAUGH  1,799,384
COMBINED BORING AND TURNING MACHINE
Filed March 28, 1928  3 Sheets-Sheet 1
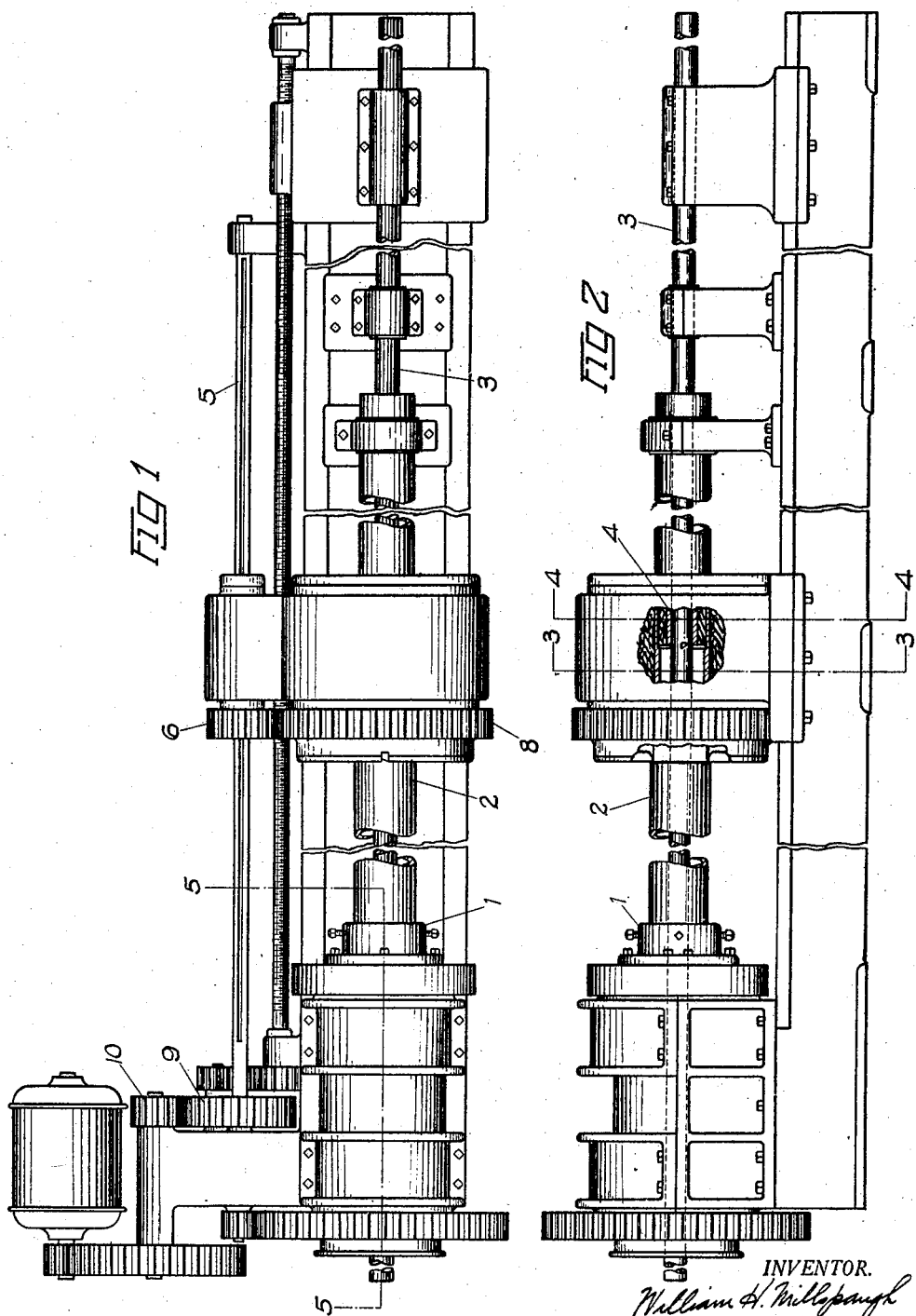
INVENTOR.
William H. Millspaugh
BY
M. S. Babcock
ATTORNEYS.

April 7, 1931. W. H. MILLSPAUGH 1,799,384
COMBINED BORING AND TURNING MACHINE
Filed March 28, 1928 3 Sheets-Sheet 2

INVENTOR.
William H. Millspaugh
BY W. S. Babcock
ATTORNEYS.

April 7, 1931. W. H. MILLSPAUGH 1,799,384
COMBINED BORING AND TURNING MACHINE
Filed March 28, 1928 3 Sheets-Sheet 3

INVENTOR.
William H. Millspaugh
BY M. S. Babcock
ATTORNEYS.

Patented Apr. 7, 1931

1,799,384

UNITED STATES PATENT OFFICE

WILLIAM H. MILLSPAUGH, OF SANDUSKY, OHIO, ASSIGNOR TO THE PAPER & TEXTILE MACHINERY COMPANY, OF SANDUSKY, OHIO, A CORPORATION OF OHIO

COMBINED BORING AND TURNING MACHINE

Application filed March 28, 1928. Serial No. 265,307.

The invention to be hereinafter described relates to a method and apparatus for boring and turning metal.

In the manufacture of sleeves for ships' propellers, cylindrical shells for the suction rolls of paper making machines, and many other tubular metal pieces, it has long been and is now common practice to first either bore the inside to a predetermined diameter and then turn the outside, or to turn the outside and then bore the inside. In either case, each operation is completed independent of the other and both operations must be entirely separate. And, of course, since each operation is entirely separate and independent of the other, either two separate machines must be used or, as is more generally the practice, the same machine is used twice for the separate operations, changing the cutting tools and their head for the outside or inside cut, respectively.

It is very general and wide spread practice both in turning and in boring to revolve the work-piece against or in cutting contact with the tools. In the case of sleeves and shells referred to, for boring, it is usual to have one end of them securely fixed in a spindle, with suitable supports intermediate of its length, if the length is great enough to warrant such supports, and to rotate the spindle and its work-piece against the cutting edges of suitable boring tools mounted in a boring head on the end of a boring bar which is fed forward into the piece as the cut progresses. A suitable spacing head or block on the end of the boring bar serves to center the tool in its cutting operation in well known manner. For turning, exactly the same procedure is followed and the same apparatus, except that a set of turning tools mounted in a suitable ring shaped holder or frame is substituted for the boring bar, its head, and the boring tools. Also, of course, the centering head is not required. The holder for the turning tools, however, is fed along the work in exactly the same way as with the boring tools.

Both operations, as will be readily understood, impose a tremendous twisting strain or torque on the work-piece. The strain varies according to the metal or material operated on, the length of the piece, its diameter, the dimensions and character of the cut, the rate of cut, the type of tools used, the set of the tool or angle at which the cut is made, the sharpness of the tool, and a number of other factors. Obviously, the great force exerted in making the cut is in no sense counteracted in the present machines or methods nor is there any way of utilizing this tremendous torque or twisting strain imposed by the boring and turning as now carried out, separately.

In the present invention, the boring and turning operations are so associated and combined as to be simultaneously performed on one and the same machine. Likewise, the two operations are so performed that the torque or twisting strain created by each is directly opposed to that of the other. It is obvious, that if the turning tools and boring tools are both stationary while the shell rotates, the total torque will be equal to the sum of the two torques,—it would simply multiply the trouble. Consequently, the difficulties are multiplied rather than reduced by a simple unchanged aggregation of the two machines into one. Of course, the cutting, in general practice, whether boring or turning, is started at the outer end and works gradually toward the spindle end. In order to adequately oppose one of these cutting operations and its resulting twisting strain or torque to the other, one or the other set of tools, in the present case, is made to rotate about the axis of rotation of the work-piece and its spindle.

For purely illustrative purposes, assume that the boring tool is non-rotating and that the shell revolves against it, creating a powerful opposing twisting action or torque. Obviously, rotation of the turning tool in the opposite direction to that of the shell can not be combined in this way, for the same reason that it is not feasible to practically aggregate in the same machine stationary tools for both cuts. In such an arrangement, the operation of the turning tool would only emphasize or increase the difficulties. On the other hand, revolution of the turning tool in the same direction as that of the shell, and, therefore, in the direction opposite to the direction of the cut of the boring tool, will accomplish no cutting or turning unless such rotation be at a greater speed than that of the shell. If the speed were just the same for both the shell and the turning tools, there would be no relative movement such as obviously necessary— no cutting action of the turning tool could be possible. If the speed of rotation or revolution of the turning tools, in the same direction as the rotation of the work-piece exceeds, in the slightest, the speed of rotation or revolution of the work-piece, the turning tools will make their turning cut to just that extent or rate. But, in order to have the two opposing forces as near as possible counterbalanced, one by the other, all other factors being considered as substantially equal, the cuts being oppositely directed, the rates of these two cuts must be maintained practically equal throughout. Since the turning tool revolves in the same direction as the shell, it must be revolved at practically twice the number of revolutions per unit of time as the shell. Revolution at the same rate, as above disclosed, would simply offset the revolution of the shell and the second revolution per unit of time would then just exactly produce a twisting force or torque which will exactly offset or counterbalance the corresponding force resulting from the action of the stationary boring tools operating against the revolving shell. Clearly, the operations could be reversed as to relative rotation of the two sets of cutting tools—the turning tools being held stationary while the boring tools are made to revolve at twice the rate of the shell and in the same direction.

It is also clear that the work-piece may be non-rotating while both the boring and turning heads are made to revolve in opposite directions and at the same rate.

In order to more clearly disclose the construction, operation, and use of the machine, and the order and steps of the method and manner in which it is carried out, reference should be had to the accompanying drawings forming part of the present application, wherein only one type and arrangement of the machine has been disclosed for illustrative purposes only, as will be evident. Throughout the several figures of the drawings like reference characters designate the same parts in the different views.

In the drawings:

Fig. 1 is a top plan view of a machine embodying the invention.

Fig. 2 is a side elevation on the tool feeding side of the machine.

Obviously, either the work-piece or the tool heads may be fed longitudinally, relatively to each other, in accordance with the cuts, as may be desired. In the various views here shown, all gear casings have been omitted, for clearness. A motor has been indicated as the source of power but it will be understood that any other suitable source of power may be used in accordance with the particular circumstances and desires of the respective users.

In the machine selected for illustrative purposes the combination of stationary boring head, revolving work-piece and revolving turning tools, has been disclosed, since the general practice, as hereinbefore stated, is to revolve the work-piece against one or the other set of cutting tools for either boring or turning.

Figure 4:
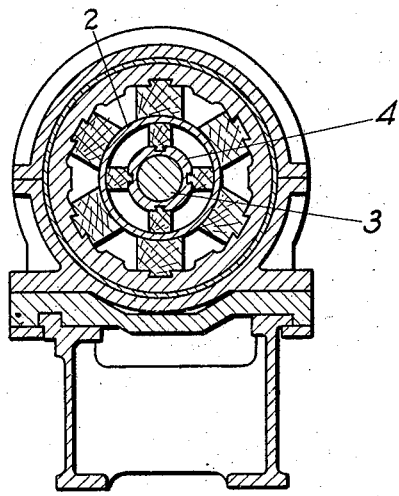
Fig. 4 is an enlarged, vertical, lateral, cross section on line 4—4 Fig. 2, through the boring head.
Figure 3:
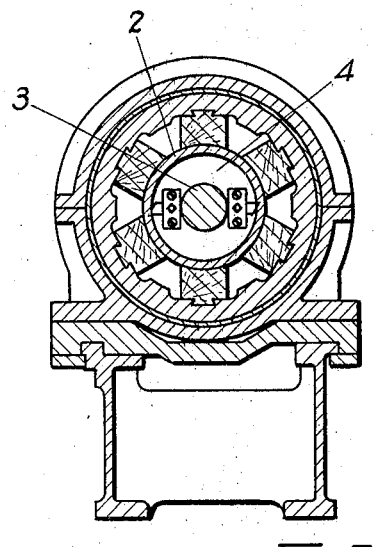
Fig. 3 is an enlarged, lateral, vertical cross section on line 3—3 of Fig. 2.
Figure 6:
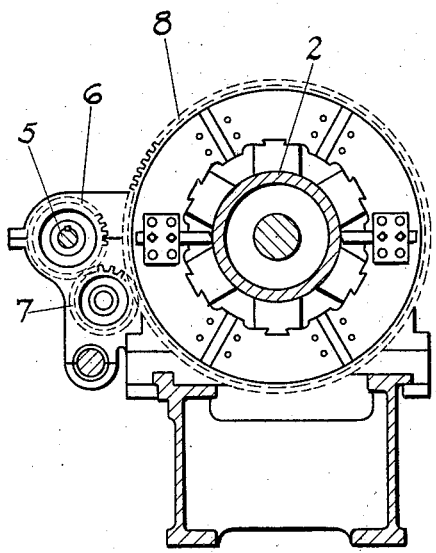
Fig. 6 is an enlarged front view of the turning head and its connections, looking from the driving head.
Figure 5:
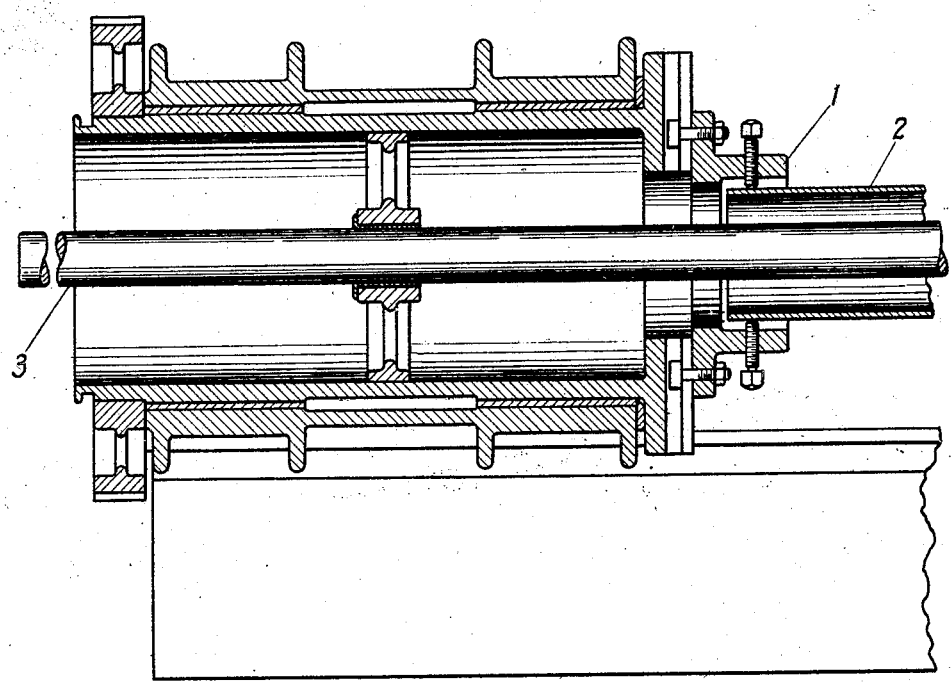
Fig. 5 is an enlarged vertical, longitudinal, cross section on line 5—5 of Fig. 1.

Referring to the drawings in detail, any usual and well known lathe bed and frame may be used for supporting the various parts. On one end is suitably mounted a well known type of driving head shown more in detail in Figs. 5 and 6. This train of gears revolves a spindle carrying a suitable chuck or work holder 1 in which is rigidly fixed in any usual and well known manner one end of the shell, sleeve or other work-piece 2. In the case of work-piece of any considerable length, one or more "steady rests" of well known use and construction may be disposed at suitable intervals in its length, to maintain a true and accurate alignment of the work-piece during the boring and turning operations. It is not thought that illustration of these steady-rests would in any degree add to a clearer understanding of the invention and, by itself, it forms no part of the same. Therefore it is neither shown in detail in the drawings nor specifically described.

For the boring operation the regular boring bar 3 with boring head 4 is used, both, in this instance, being non-rotating. This boring head is mounted in the usual carriage in any well known manner and is fed along longitudinally in the cut as the work progresses, the usual and well known feed screw and half-nut being the preferable construction for this purpose. The feed screw may be operated from the train of gears in the driving head in usual and well known manner, and, therefore, need not be further illustrated or described. Thus, the machine so far briefly described in detail, may be substantially the same as well known types of boring machines applicable to this general class of work. In order to practically incorporate in and operatively combine with such machine, suitable mechanism for effecting the turning operation, means must be provided for driving the turning tools while in cutting engagement with the work-piece, as hereinabove set forth. Preferably, this comprises simply a shaft with a pinion at one end meshing with and driven by the gear train of the driving head and suitable gearing connections between such shaft and a revoluble turning head, all as will later appear in detail. The turning head may be of usual and well known type such as is at present regularly used. Freely revoluble in the well known carriage, it is adapted to be fed forward to its work in well known manner by a half nut, co-operating with the same feed screw as is used to feed the boring bar. The feeding operation for both may be the same. In this way, of course, the feed is not only the same but at the same rate and simultaneous, so that both sets of tools advance together and at the same rate. The feed of the turning head, as will be clear, is toward the driving head or work spindle. There must be continual driving connection between the turning head gears and the gear or pinion on the transmission or countershaft 5. So, to provide lengthwise travel of the turning head, relatively to such shaft, the pinion 6 is slidably keyed thereto. As shown in the drawings pinion 6 intermeshes with and drives gear 7 which, in turn, meshes with and drives the larger ring gear 8 fixed to and revolving with the turning head. On the opposite end of the transmission shaft is rigidly fixed a pinion 9 which meshes with and is driven by a pinion 10 fixed to one of the gear stub shafts of the gear train, extended. Since the gear train, through these connections, drives the turning head as well as the work-piece spindle, it is only a matter of simple proportions to so devise and arrange the gears that the turning head will be revoluble in the same direction as the work-piece but at twice the number of revolutions per unit of time. The gearing herein illustrated and more specifically referred to is a simple, compact, and efficient type which under actual working conditions has been found eminently satisfactory in every respect.

It is obvious that many other gearing arrangements may be resorted to and other types of drive included in the train while producing exactly the same result—i. e. that of driving the turning head in the same direction of rotation as the work-piece and at twice its speed of rotation. Likewise, the boring head and turning head feed may be different in many respects than disclosed. Also, of course, they may be separate and independent. The arrangement herein disclosed is simple, compact, positive in action, and definitely assures exactly the same equal, simultaneous, longitudinal feed of both sets of cutting tools.

The method involved is to so direct and regulate the two cutting operations that the tremendous twisting strain or torque of one will be completely absorbed by that of the other. In general, among the ways of accomplishing this result may be stated the following: revolving the work-piece about stationary boring tools and simultaneously revolving the turning tools about the work-piece in the same direction and at twice the speed of revolution; or, secondly, reversing this relative rotation; or, thirdly, holding the work-piece stationary and revolving both sets of tools about its longitudinal axis, in opposite directions, and at the same number of revolutions per unit of time.

Figure 7:
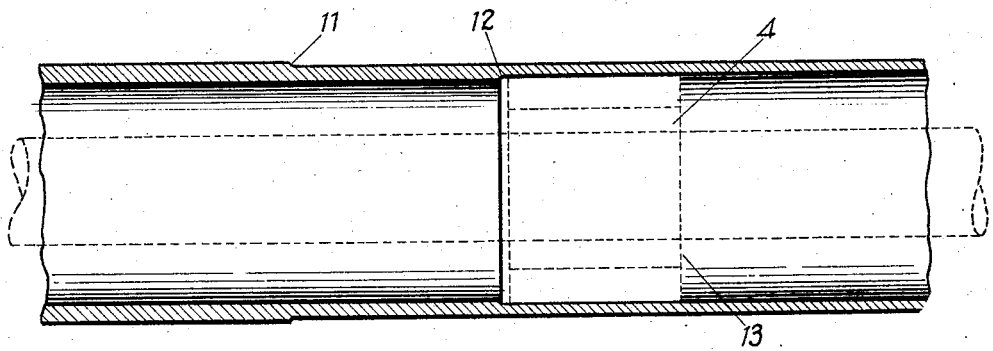
Fig. 7 is a central, longitudinal, vertical cross section through a tube or shell in process, indicating the relative longitudinal positions of the tools, by their cuts.

On reference to Fig. 7, it will be seen that the turning tools are considerably in advance of the boring tools, leaving that length of shell considerably thicker than the finished shell. The thickness of the shell at any portion of its length where both cuts have been completed, in many cases, is not great enough to adequately support it. Consequently it is advisable, always, to leave this thickened wall extending throughout a sufficient portion of the turning head. As is well known, the tendency of the boring tools, due to the great strain of the boring operation, is to swing outwardly on a greater radius or expand. In the ordinary boring operation, this is avoided by leaving the shell wall of such thickness as to completely resist and prevent any such expansion. In such ordinary boring operation, the shell is only rough turned at first, then bored and, after that, finish turned. On the other hand, in the present invention, the complete turning is done in advance of the boring. This leaves a shell wall strong enough to support the shell in the turning head block, but not strong enough to resist the expanding tendency of the following boring tools. Therefore, to adequately brace the completely turned shell against this expansion the turning head block is considerably elongated to surround and brace the completely turned and bored shell for a length equal to the thickness of the boring head, as well as for the length of shell between the turning and boring tools. Consequently, by so disposing the turning head, the shell is adequately supported and rigidly braced to enable complete finish turning and complete boring at one and the same time on a single combined machine.

In Fig. 7, the distance between the points 11 and 12 indicates the length of the completely finished turned but unbored section, the distance between the points 12 and 13 indicates the length of the completely finished (bored and turned) shell within the block of the turning head as well, also, as the longitudinal thickness of the boring head, while the total distance between the points 11 and 13 indicates the total length of the block of the turning head, surrounding and bracing both the turned but unbored portion and that portion together with such completely finished portion as is fully occupied by the boring head.

Many changes may be made in the details and in the construction and arrangement of various parts of the machine, within the scope of the appended claims, without in any degree departing from the field and scope of the invention, and it is meant to include all such within this application wherein only a single preferred type of machine has been disclosed for illustrative purposes.

What I claim is:

1. In a machine of the character described, a revoluble work-piece support, a nonrevoluble boring tool, a revoluble turning tool, a ring gear for revolving the turning tool in the same direction as the aforesaid work-piece support and at such speed as to produce a resultant force approximately equal to that produced by the boring operation, said turning tool operating considerably in advance of the boring tool longitudinally of the work piece and means for driving said ring gear.

2. In a machine of the character described, a revoluble work-piece support, a nonrevoluble boring tool, a revoluble turning tool, a ring gear for revolving the turning tool in the same direction as the aforesaid work-piece support and at such speed as to produce a resultant force approximately equal to that produced by the boring operation, means supported by the revoluble turning tool structure for bracing the work-piece against the strains of the turning operation and means for driving said ring gear.

3. In a machine of the character described, a revoluble work-piece support, a nonrevoluble boring tool, a revoluble turning tool, a ring gear for revolving the turning tool in the same direction as the aforesaid work-piece support and at such speed as to produce a resultant force approximately equal to that produced by the boring operation, means supported by the revoluble turning tool structure for bracing the work-piece against the expanding action of boring tools and means for driving said ring gear.

4. In a machine of the character described, a revoluble work-piece support, a nonrevoluble boring tool, a revoluble turning tool, a ring gear for revolving the turning tool in the same direction as the aforesaid work-piece support and at such speed as to produce a resultant force approximately equal to that produced by the boring operation, means for bracing the work-piece against strains of the turning operation, means supported by the revoluble turning tool structure for bracing the work-piece against the expanding action of the boring tools and means for driving said ring gear.

5. In a machine of the character described, a work piece support adapted to maintain long tubular bodies in operative position means for revolving said support and a tube carried thereby, a cylindrical head concentric with said tube and spaced outwardly radially therefrom, turning tools carried by said head and adapted to operate upon said tube, a ring gear for revolving said head, means for driving said ring gear, means for feeding said driving means longitudinally with and at the same rate as said head, means for feeding said head longitudinally of said tube, means for revolving said tube in a direction opposite to that of said turning tools, a boring tool extending within said tube, and means for feeding said boring tool longitudinally within said tube.

6. In a machine of the character described, a work piece support, a cylindrical head, a ring gear carried by said head, means engaging and driving said ring gear, means for feeding said driving means longitudinally with and at the same rate as said head, turning tools carried in said head, and a boring tool within said head and radially spaced therefrom to provide a passage therebetween for a work piece.

7. In a machine of the character described, a work piece support, a cylindrical head, a ring gear carried by said head, means engaging and driving said ring gear, means for feeding said driving means longitudinally with and at the same rate as said head, turning tools carried in said head, a boring tool within said head and radially spaced therefrom to provide a passage therebetween for a work piece, and means for simultaneously feeding said boring tool longitudinally of a work piece in said work piece support.

8. In a machine of the character described, a work piece support, a cylindrical head, a ring gear carried by said head, means engaging and driving said ring gear, means for feeding said driving means longitudinally with and at the same rate as said head, turning tools carried in said head, a boring tool within said head and radially spaced therefrom to provide a passage therebetween for a work piece, and means for revolving said boring tool.

9. In a machine of the character described, a work piece support, a cylindrical head, a ring gear carried by said head, means engaging and driving said ring gear, means for feeding said driving means longitudinally with and at the same rate as said head, turning tools carried in said head, and a boring tool within said head and radially spaced therefrom to provide a passage therebetween for a work piece, and longitudinally spaced from the turning tools to leave a thickened portion of work piece to sustain the cutting strain of the boring tool.

In testimony whereof I affix my signature.

WILLIAM H. MILLSPAUGH.